(12) United States Patent
Morris et al.

(10) Patent No.: US 6,708,277 B1
(45) Date of Patent: Mar. 16, 2004

(54) METHOD AND SYSTEM FOR PARALLEL BUS STEPPING USING DYNAMIC SIGNAL GROUPING

(75) Inventors: Bob Prescott Morris, Phoenix, AZ (US); Barry Niles Altschuler, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/571,311

(22) Filed: May 12, 2000

(51) Int. Cl.[7] .............................. G06F 1/32; G06F 13/00
(52) U.S. Cl. ...................... 713/300; 710/107; 710/305
(58) Field of Search .................................... 713/300, 320, 713/322, 340; 326/21, 30; 710/100, 126, 107, 305

(56) References Cited

U.S. PATENT DOCUMENTS

| | | | | | |
|---|---|---|---|---|---|
| 4,667,337 | A | * | 5/1987 | Fletcher ........................ | 377/41 |
| 5,349,666 | A | * | 9/1994 | Adachi et al. ............... | 713/300 |
| 5,630,145 | A | | 5/1997 | Chen .......................... | 395/750 |
| 6,243,779 | B1 | * | 6/2001 | Devanney et al. .......... | 710/305 |
| 6,259,383 | B1 | * | 7/2001 | Miki ............................ | 341/52 |
| 6,389,522 | B1 | * | 5/2002 | Usami ......................... | 711/167 |
| 6,487,250 | B1 | * | 11/2002 | Kato et al. ................... | 375/257 |
| 6,513,137 | B1 | * | 1/2003 | Cortner et al. .............. | 714/736 |

FOREIGN PATENT DOCUMENTS

| | | | | | |
|---|---|---|---|---|---|
| JP | 363071788 | A | * | 4/1988 | ........... G06F/15/74 |
| JP | 11053169 | A | * | 2/1999 | ............. G06F/5/00 |

OTHER PUBLICATIONS

IBM Technical Disclosure Bulletin—"Design of a Totally Interlocked Data Path for Noise Reduction"—Oct. 1, 1993—vol. 36—Issue 10—pp. 17–18.*

* cited by examiner

Primary Examiner—Thomas Lee
Assistant Examiner—Thuan Du

(57) ABSTRACT

In a parallel interface bus structure (FIG. 4, 110), a determination is made as to the number of signals will be allowed to change state during a clock period. This determination is made in accordance with the power consumption requirements of the particular computer communications system (FIG. 1). A processor (FIG. 4, 120) ascertains the number of clock periods required to perform the changes in state of an information word based on the power consumption requirements and the number of changes in state required to complete the information word. The processor (120) then makes the changes using the least number of clock periods and transmits a data ready indication when the process is complete. This results in fewer clock periods required to transmit an information word while adhering to power consumption requirements.

18 Claims, 4 Drawing Sheets

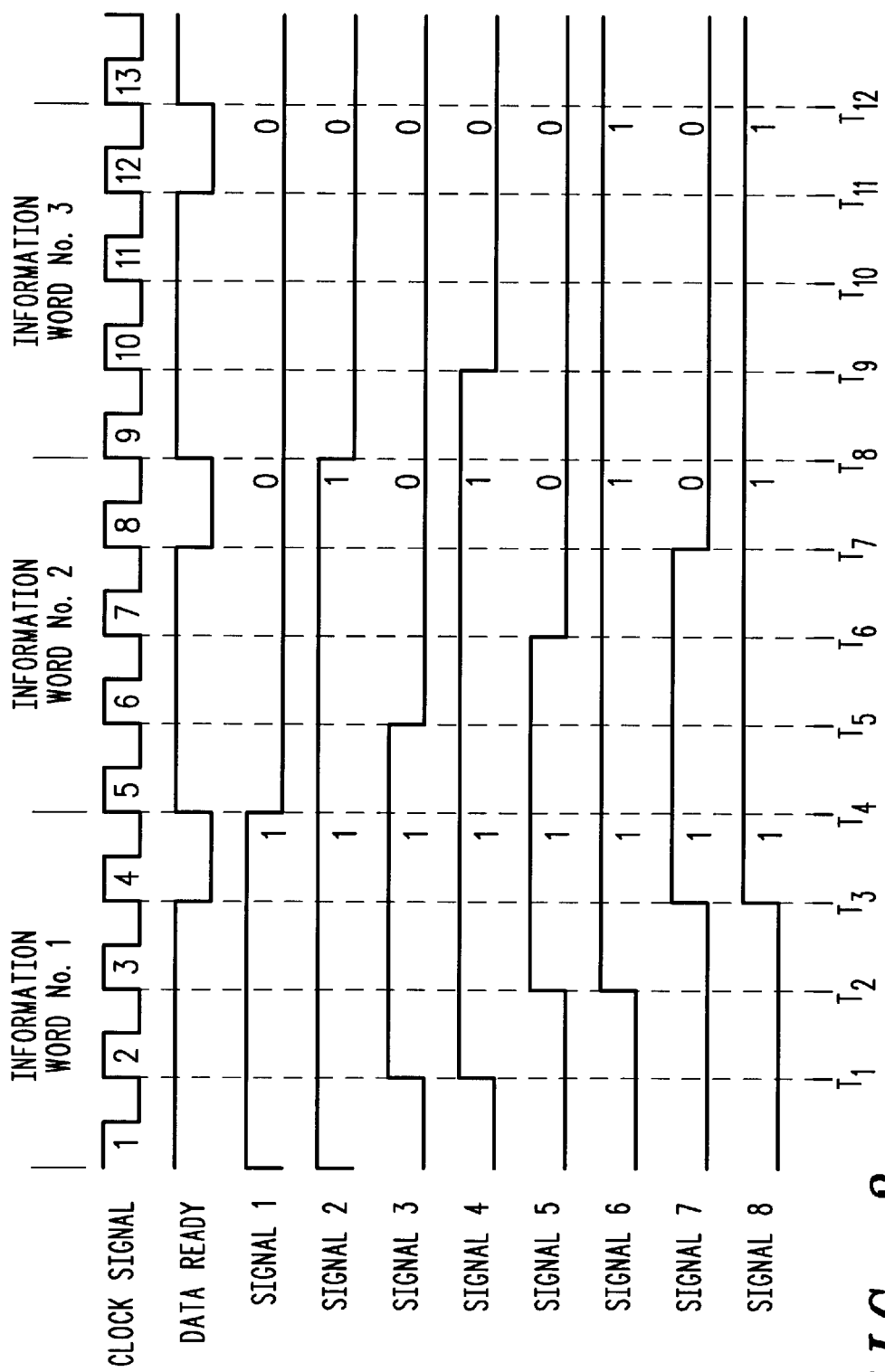
FIG. 2 —PRIOR ART—

METHOD AND SYSTEM FOR PARALLEL BUS STEPPING USING DYNAMIC SIGNAL GROUPING

FIELD OF THE INVENTION

The invention relates to the field of computer communications and, more particularly, to a method and system for parallel bus stepping using dynamic signal grouping.

BACKGROUND OF THE INVENTION

In modern-day portable computer systems, emphasis is placed on reducing the power required to perform various computer processes. By reducing power consumption, portable computer users can operate under battery power for extended periods of time. Additionally, batteries can be made smaller and more lightweight while still providing the same number of operating hours. This enables portable computer systems to be even more attractive to users to due to their increased portability.

In order to reduce the power required to perform communications functions, portable computer units can make use of various standards, such as the Peripheral Component Interconnect bus in order to be interfaced with ancillary equipment such as disk drives and printer equipment. Generally, these bus structures provide operating protocols in which speed and power can be traded in order to optimize performance under various circumstances. Thus, speed can be sacrificed in order to reduce power consumption while power consumption can be increased in order to provide a higher speed interface with ancillary components.

Therefore, it is highly desirable to make use of a parallel bus structure which allows a high-speed interface with peripheral components while maintaining a low level of power consumption.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 2 is a timing diagram of an eight-signal parallel bus structure in accordance with the use of conventional parallel bus structures;

DESCRIPTION OF THE PREFERRED EMBODIMENTS

A method and system for parallel bus stepping using dynamic signal grouping allows a parallel bus structure to operate at a high data rate while minimizing power consumption. This allows computers to efficiently communicate with peripheral devices without placing additional demands on power storage and power conversion equipment. This results in portable computer systems which are more capable and require less battery power than their predecessors, thus enhancing the appeal of portable and laptop computer units.

Figure 1:
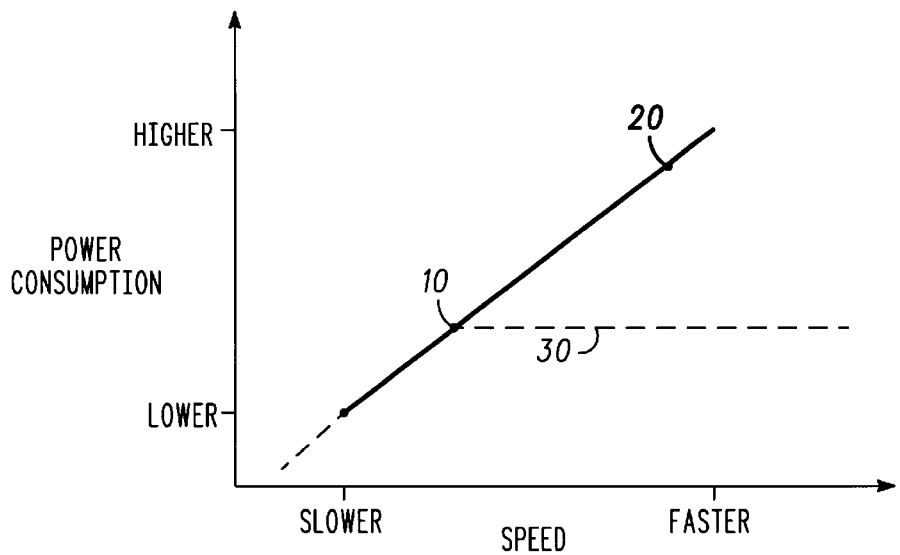
FIG. 1 is an illustration of power consumption versus speed of a parallel interface bus in accordance with the use of conventional parallel bus structures.

FIG. 1 is an illustration of power consumption versus speed of a parallel interface bus in accordance with the use of conventional parallel bus structures. In FIG. 1, a measure of power consumption is oriented in the vertical direction, while a measure of the relative speed of the parallel interface bus is oriented in the horizontal direction. In conventional systems, the user must decide whether reducing power consumption is necessary (at the expense of interface bus speed), or whether a premium is to be placed on interface bus speed (at the expense of increased power consumption). In FIG. 1, Point "10" represents a relatively low power consumption, low speed interface bus while point "20" represents a higher speed, higher power consumption interface bus. Point "30" represents a desirable condition where interface bus speed can be increased without requiring the interface bus to consume additional power. Point "30" is not obtainable through the use of a conventional parallel interface bus structure.

FIG. 2 is a timing diagram of an eight-signal parallel bus structure in accordance with the use of conventional bus structures. In FIG. 2, information words 1, 2, and 3 are intended for transmission along a parallel bus structure. The parallel bus structure inferred by FIG. 2 includes a clock signal, data ready signal, and signals 1–8. In a preferred embodiment, the clock signal, data ready signal, and signals 1–8 each propagate through a dedicated conductor to at least one external component. Information words 1–3 are representative of data transmitted along the parallel bus structure of inferred by FIG. 2, or can be representative of address information which identifies a particular receiving element, or group of receiving elements which are interfaced to a parallel bus structure.

The clock signal of FIG. 2 functions to provide external equipment with the timing information sufficient to indicate the start and stop of an information or management signal, such as the data ready signal also shown in FIG. 2. The end of each clock signal period of FIG. 2 is denoted by $T_1$ through $T_{12}$. Note that the parallel bus structure inferred by FIG. 2 can incorporate additional control and management signals, such as an address and data strobe, frame identifier, or other signal not shown in the FIG. 2.

In the example of FIG. 2, address and data stepping are used in order to reduce power consumption of the parallel bus structure in accordance with conventional techniques, such as address and data stepping used in the Peripheral Component Interconnect bus specification. Therefore, the example of FIG. 2 is indicative of a power consumption and interface bus speed which corresponds to a location near point "10" of FIG. 1.

In the example of FIG. 2, signals 1–2 are allowed to change during clock period 1, signals 3–4 are allowed to change during clock period 2, signals 5–6 are allowed to change during clock period 3, and signals 7–8 are allowed to change during clock period 4. Through this technique of address and data stepping, 4 clock cycles are required in order to convey a set of 8 binary 1's along the parallel bus structure. After the start of clock period 4, a data ready signal is asserted. This signal notifies the external components coupled to the parallel bus structure by FIG. 2 that information word 1 is available for reception.

Further in accordance with the conventional technique of address and data stepping, signal 1 changes from a binary 1 to a binary 0 during clock period 5, which corresponds to the $1^{st}$ clock period of information word 2 of FIG. 2. Signal 2 does not change in information word 2. Signal 3 changes from a binary 1 to a binary 0 during clock period 6, while signal 4 remains a binary 1. Further, signals 5 and 6 change state from a binary 1 to a binary 0 during clock periods 7 and 8, respectively. Signals 6 and 8 do not change for the example of information word 2. During clock period 8, the data ready signal is asserted in order to notify the external components that a completed information word is now present on the parallel interface bus inferred by FIG. 2.

Also in accordance with the conventional technique of data stepping, signals 1, 3 and 5–8 remain at their current states in order to form information word 3. Signal 2 changes from a binary 1 to a binary 0 during the first clock period of information word 3, while signal 4 changes during the 2nd clock period of information word 3. At clock period 12, the data ready signal is asserted in order to notify external equipment that a completed information word is present on the parallel bus structure.

In the example of FIG. 2, which illustrates a conventional technique of address and data stepping, it is important to point out that four clock periods are always required in order to complete an information word. This is the case even though only very few signals actually change states during the formation of a new word. The example of FIG. 2 could have been illustrated using an address and data stepping scheme in which only 1 signal was allowed to change states during each clock period. In this case, each information word would have required 8 clock periods is in order to complete the transmission of a single 8-bit word. Although this technique would have resulted in requiring the least amount of power in order to transmit each 8-bit word, the technique would reduce the speed of the parallel interface bus by a factor of two.

In a similar manner, the example of FIG. 2 could also have been illustrated using an address and data stepping scheme in which signals 1–4 were allowed to change states during clock period 1, and signals 5–8 were allowed to change during clock period 2. In this case, each information word would have required only 2 clock periods in order to complete the transmission of each 8-bit information word.

Figure 3:
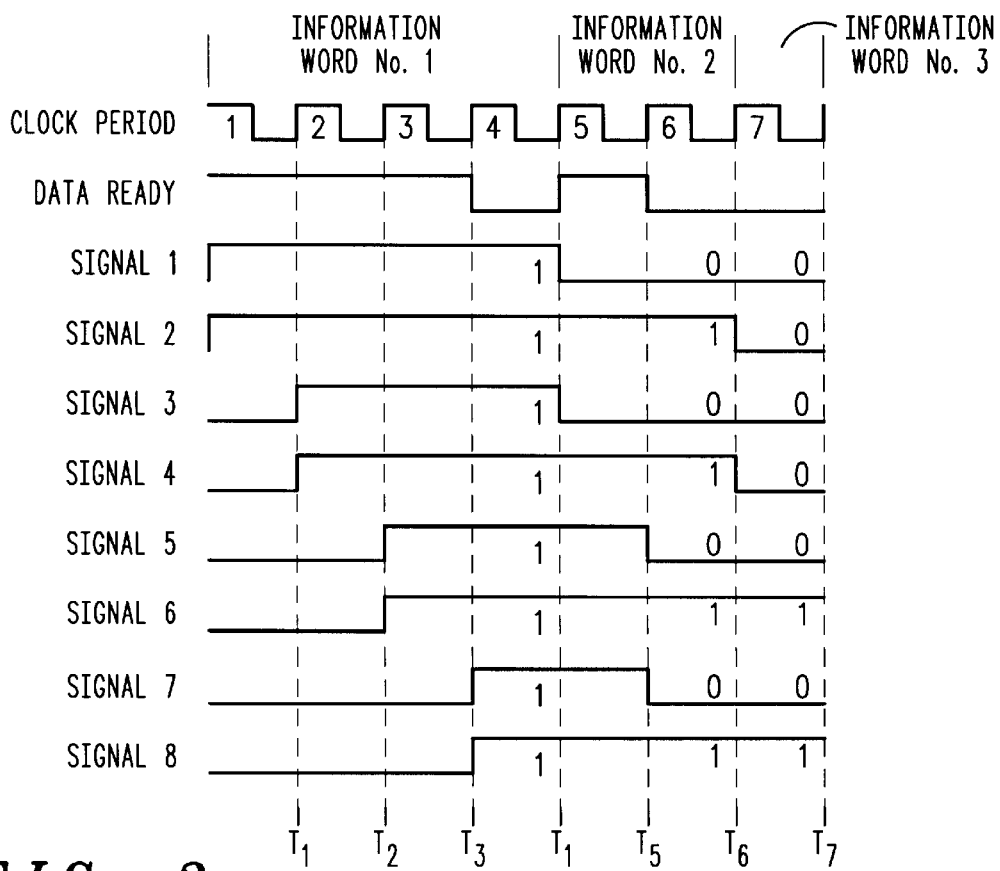
FIG. 3 is a timing diagram of an eight-signal parallel bus structure using dynamic signal grouping in accordance with a preferred embodiment of the invention.

FIG. 3 is a timing diagram the of an 8-signal parallel bus structure using dynamic signal grouping in accordance with a preferred embodiment of the invention. In FIG. 3, information words 1, 2, and 3 are the same value as information words 1, 2, and 3 of FIG. 2. Additionally, in order to reduce the power consumption of the parallel bus structure represented by FIG. 3, only 2 of the 8 signals will be changed during any clock period. Thus, a change of state of each of signals 1–8 requires 4 clock periods. When each of signals 1–8 has changed state to reflect a set of binary 1's, a data ready signal is asserted. Similar to FIG. 2, this data ready signal informs any external component interfaced to the parallel bus structure of FIG. 3 that information word 1 is ready for reception.

In order to convey information word 2 along the parallel interface bus inferred by FIG. 3, signals 1–3 are set to a binary 0 during clock period 5. During clock period 6, signals 5 and 7 are changed to a binary 0. In this manner, the dynamic grouping of signals 1–3 and 5–7 enables a change of state which requires only 2 clock periods in order to complete. Through this dynamic grouping, the data ready signal can be asserted during clock period 6 in order to notify external components that information word 2 is complete and ready to be received.

In order to convey information word 3 along the parallel interface bus inferred by FIG. 3, signals 2 and 4 are set to a binary 0. Thus, these changes in the state of signals 2 and 4 can be completed during clock period 7, thus requiring only one clock period to complete all of the changes in the binary state of each of the 8 signals of the parallel bus structure which are required in order to form information word 3. Therefore, the data ready signal can be asserted during clock period 7 in order to notify the external equipment that information word 3 is complete and ready for reception.

As illustrated in the example of FIGS. 2 and 3, the principles of the invention provide savings in the number of clock periods required to complete an information word. The amount of the savings is determined in accordance with the number of signals which must undergo a change of state as the parallel bus structure transitions from one information word to the next. In the example of FIG. 3, only 7 clock periods were required in order to convey 3 information words while 12 clock periods were required in order to transmit the same 3 information words, using the conventional address and data stepping of FIG. 2. Additionally, both FIGS. 2 and 3 represent the case of allowing only 2 of the 8 signals to change state during any given clock period.

The principles used in the example of FIG. 3 can be extended to parallel bus structures which make use of address and data stepping using any number of signals. Thus, the principles can easily be extended to other parallel bus structures, such as the Peripheral Component Interconnect bus, which makes use of 32 signal conductors. For those instances which require a change to very few of the set of signal conductors, such as in information word 3 of FIG. 3, the maximum savings in clock periods can be realized. From a statistical standpoint, it is expected that over a period of time, each signal conductor can be expected to change less than half of the time. Thus, it is expected that the preferred embodiment of the present invention will result in an average savings in clock periods of more than 50 percent over conventional stepping techniques. This, in turn, is expected to increase the speed of the parallel bus by a factor of more than two.

Figure 4:
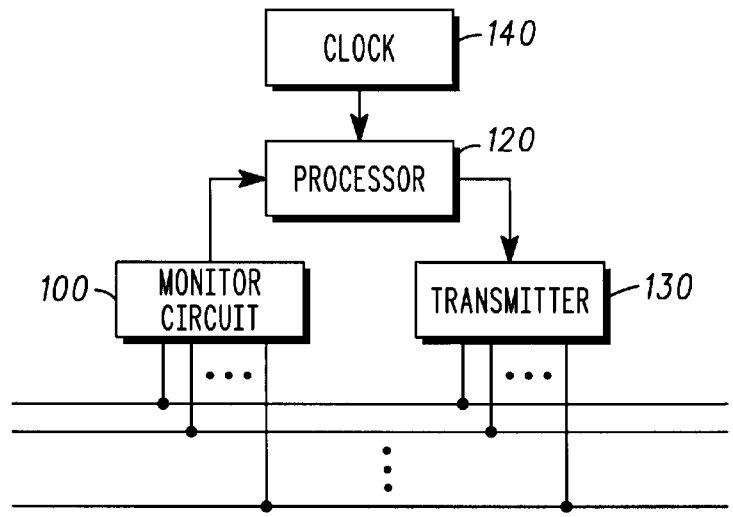
FIG. 4 is a block diagram of a system for limiting the power required to drive signals in a parallel bus structure in accordance with a preferred embodiment of the invention.

FIG. 4 is a block diagram of a system for limiting the power required to drive signals in a parallel bus structure in accordance with a preferred embodiment of the invention. In FIG. 4, monitor circuit 100 is interfaced to parallel bus structure 110. Monitor circuit 100 serves to determine the state of each of the signal conductors of parallel bus structure 110 using low-power integrated circuitry. Monitor circuit 100 is also interfaced to processor 120. Based on the outputs of monitor circuit 100, processor 120 determines the number of signals which are expected to change in order to form a second or subsequent information word to be transmitted along parallel bus structure 110. When this determination has been made, processor 120 dynamically allocates some signals to change state during a first clock period, and allocates others to change state during subsequent clock periods. In accordance with the allocation or grouping function performed by processor 120, the time at which a read indication is transmitted by way of transmitter 130 along parallel bus structure 110 can be adjusted. This allows transmitter 130 to make use of the minimum number of clock periods in order to transmit each information word in response to a control signal from processor 120. Processor 120 also includes an interface to clock 140 in order to maintain synchronization with other components of the computer system.

Monitor circuit 100 need not monitor all signals in parallel bus structure 110. For those applications in parallel bus structure 110 includes a number of control and management signal conductors, these signals are not required to be interfaced to monitor circuit 100, thus reducing the complexity and further reducing the power consumption needs of the circuit. In a preferred embodiment, monitor circuit 100 monitors only the signal conductors which convey address or data information.

Figure 5:
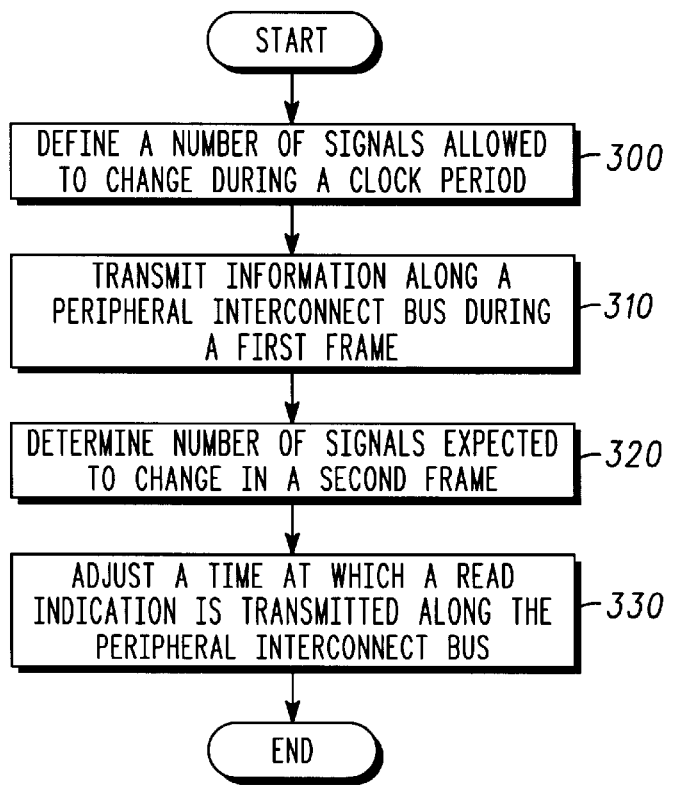
FIG. 5 is a flowchart of a method for dynamic signal grouping used in a parallel bus structure in accordance with a preferred embodiment of the invention.

FIG. 5 is a flowchart of a method for dynamic signal grouping used in a parallel bus structure in accordance with a preferred embodiment of the invention. The apparatus of FIG. 4 is suitable for performing the method of FIG. 5. FIG. 5 begins at step 300 in which a number of signals allowed to change during a clock period is defined. In a preferred embodiment, step 300 is performed in conjunction with the defining of a power budget which influences the number of signals which can be allowed to change during a particular clock period.

The method continues at step 310, in which information is transmitted along the parallel bus structure during a first frame. At step 320, a processor determines the number of signals expected to change in a second frame, which, preferably, immediately follows the first frame. In step 330, a time is adjusted at which an indication that the information is ready can be transmitted along the parallel bus structure. Desirably, the adjusting step occurs through the use of a data ready signal.

Figure 6:
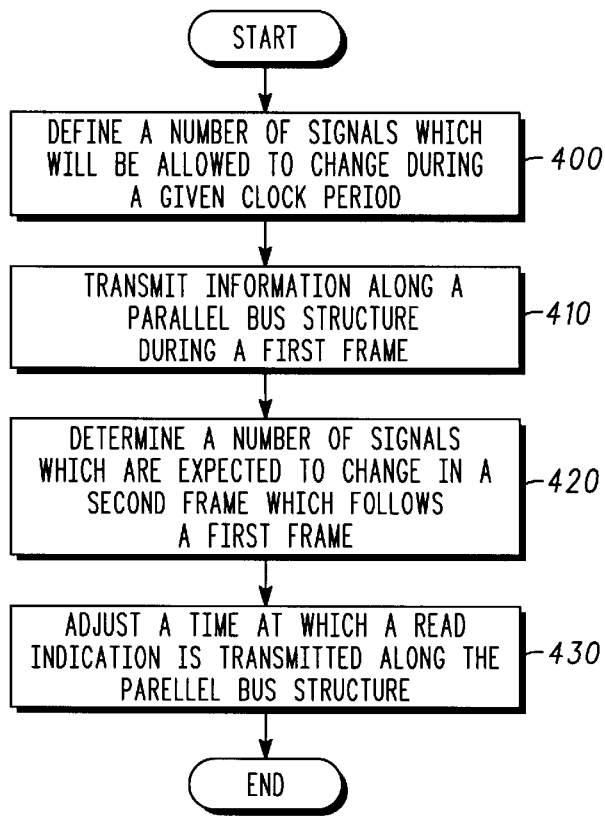
FIG. 6 is another flowchart of a method for dynamic signal grouping used in a parallel bus structure in accordance with a preferred embodiment of the invention.

FIG. 6 is a flowchart of a method for dynamic signal grouping used in a peripheral component interconnect bus in accordance with a preferred embodiment of the invention. The apparatus of FIG. 4 is suitable for performing the method of FIG. 5. FIG. 6 begins at step 400 in which a number of signals allowed to change during a clock period is defined. In a preferred embodiment, step 400 is performed in conjunction with the defining of a power budget which influences the number of signals which can be allowed to change during a particular clock period.

The method continues at step 410, in which information is transmitted along the peripheral component interconnect bus during a first frame. At step 420, a processor determines the number of signals expected to change in a second frame, which, preferably, immediately follows the first frame. In step 430, a time is adjusted at which an indication that the information is ready can be transmitted along the peripheral component interconnect bus. Desirably, the adjusting step occurs through the use of a data ready signal and is based on an outcome of step 420.

Figure 7:
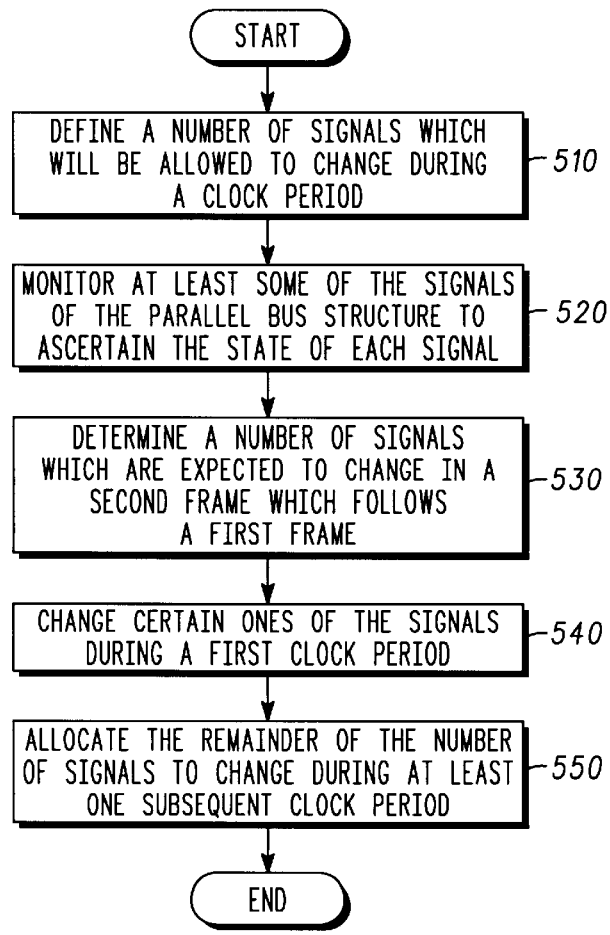
FIG. 7 is flowchart of still another method for dynamic signal grouping used in a parallel bus structure in accordance with a preferred embodiment of the invention.

FIG. 7 is flowchart of another method for dynamic signal grouping used in a parallel bus structure in accordance with a preferred embodiment of the invention. The apparatus of FIG. 4 is suitable for performing the method of FIG. 7. The method begins at step 510 in which the number of signals which are allowed to change during a clock period is defined. Desirably, step 510 is performed in conjunction with establishing a power budget which influences the number of signals which the parallel bus structure will be allowed to change during a clock period. The method continues at step 520 where at least some of the signals of the parallel bus structure are monitored in order to ascertain the state of the signals. At step 530, the number of signals which are expected to change in a second frame, which preferably follows a first frame, is determined. At step 540, certain ones of the signals are changed during a first clock period. At step 550, the remainder of the number of signals identified as requiring a change in state are allocated to change during at least one subsequent clock period. Desirably, the clock period of step 550 immediately follows the clock period of step 540.

In conclusion, a method and system for parallel bus stepping using dynamic signal grouping allows a parallel bus structure to operate at a high data rate while minimizing power consumption. This allows computers to efficiently communicate with peripheral devices without placing additional demands on power storage and power conversion equipment. This results in portable computer systems which are more capable and require less battery power than their predecessors, thus enhancing the appeal of portable and laptop computer units.

Accordingly, it is intended by the appended claims to cover all modifications of the invention that fall within the true spirit and scope of the invention.

What is claimed is:

1. In a Peripheral Component Interconnect bus, a method for limiting power used to convey information from a transmitter along said Peripheral Component Interconnect bus, comprising the steps of:

transmitting information along said Peripheral Component Interconnect bus during a first frame;

determining a number of signals which are expected to change in a second frame which follows said first frame; and adjusting a time at which a read indication is transmitted along said Peripheral Component Interconnect bus based on said determining step.

2. The method of claim 1, wherein said second frame is transmitted immediately following said first frame.

3. The method of claim 1, wherein said adjusting step is performed by changing a value of a data ready signal on said Peripheral Component Interconnect bus.

4. The method of claim 1, additionally comprising the step of defining a number of signals of said Peripheral Component Interconnect bus which will be allowed to change during a clock period.

5. The method of claim 4, wherein said defining step further comprises the step of establishing a power budget which influences said number of signals of said Peripheral Component Interconnect bus which will be allowed to change during said clock period.

6. In a parallel bus structure, a method for limiting power used to convey information from a transmitter interfaced to said parallel bus structure, comprising the steps of:

transmitting information along said parallel bus structure during a first frame;

determining a number of signals which are expected to change in a frame which follows said first frame; and adjusting a time at which a read indication is transmitted along said parallel bus structure based on an outcome of said determining step.

7. The method of claim 6, wherein said determining step is performed using a frame which is transmitted immediately following said first frame.

8. The method of claim 6, wherein said adjusting step is performed by changing a value of a data ready signal on said parallel bus structure.

9. The method of claim 6, additionally comprising the step of defining a number of signals of said parallel bus structure which will be allowed to change during a clock period.

10. The method of claim 9, wherein said defining step further comprises the step of establishing a power budget which influences said number of signals of said parallel bus structure which will be allowed to change during said clock period.

11. In a parallel bus structure, a method for limiting power required to convey information from a transmitter along said parallel bus structure, comprising the steps of:

monitoring said parallel bus structure to ascertain a state of at least some signals of said parallel bus structure;

determining a number of signals which are expected to change in a second frame which follows a first frame;

changing certain ones of said number of signals during a first clock period; and allocating a remainder of said number of signals to change during at least one subsequent clock period.

12. The method of claim 11, wherein said at least one subsequent clock period immediately follows said first clock period.

13. The method of claim 11, further comprising the step of defining a number of signals which will be allowed to change during a clock period.

14. The method of claim 13, wherein said defining step further comprises the step of establishing a power budget which influences said number of signals of said parallel bus structure which will be allowed to change during said clock period.

15. A system for limiting power required to drive signals on a parallel bus structure, comprising:

a monitor which determines a state of a set of conductors of said parallel bus structure during transmission of an information word;

a processor, coupled to said monitor, which determines which of said set of conductors of said parallel bus structure should change state in a subsequent information word; and a transmitter, coupled to said processor, which changes a state of only those conductors of said parallel bus structure which should change state in a subsequent information word.

16. The system of claim 15, wherein said processor is additionally coupled to a clock, said processor further determining which of said set of conductors of said parallel bus structure should change state in a subsequent information word during a clock period.

17. The system of claim 16, wherein said transmitter changes state of certain ones of said set of conductors of said parallel bus structure during a first clock period in response to a control signal from said processor.

18. The system of claim 17, wherein said transmitter changes state of certain other ones of said set of conductors of said parallel bus structure during a subsequent clock period in response to a control signal from said processor.

* * * * *